Oct. 5, 1965  C. W. RAMSEY ETAL  3,210,030
WIRING HARNESS INSTALLATION
Filed Jan. 7, 1963
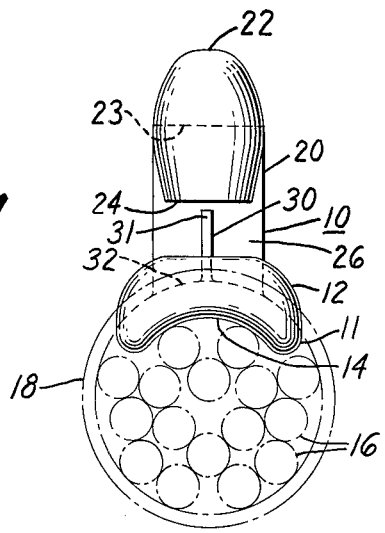
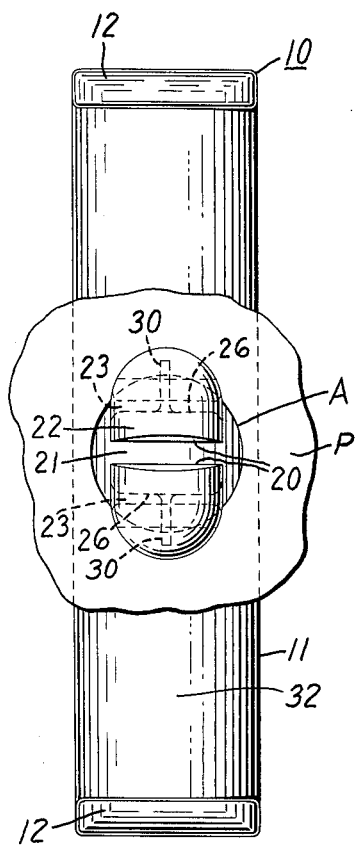
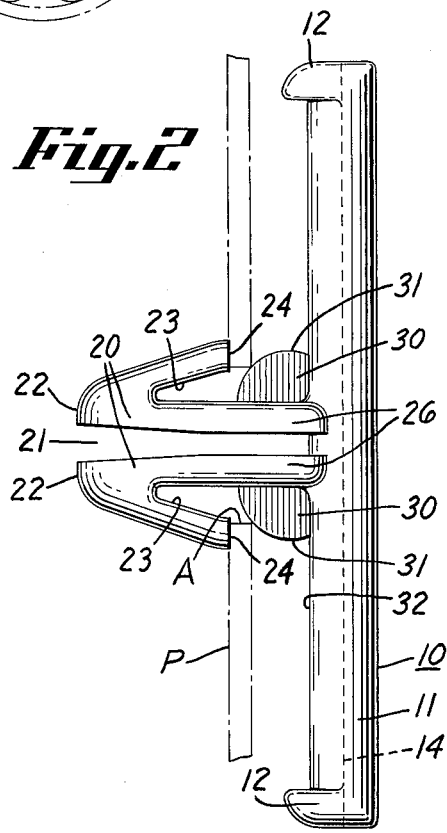
INVENTORS
CHARLES W. RAMSEY
NORMAN F. UHLIR
BY
*Albert H. Reuther*
THEIR ATTORNEY

United States Patent Office 3,210,030
Patented Oct. 5, 1965

3,210,030
WIRING HARNESS INSTALLATION
Charles W. Ramsey, Niles, Ohio, and Norman F. Uhlir, Royal Oak, Mich., assignors to General Motors Corporation, Detroit, Mich., a corporation of Delaware
Filed Jan. 7, 1963, Ser. No. 249,755
1 Claim. (Cl. 248—71)

This invention relates to wiring harness clip means of plastic material, and more particularly, to improvement and refinement of installation mounting features differing from those shown by U.S. Patent 2,931,851—Sims issued April 5, 1960, for a Snap-In Retainer for Wiring Harness and belonging to the assignee of the present invention.

An object of this invention is to provide installation means integrally on harness clip means in which a grip portion is made to a greater variation in aperture sizes provided in vehicle mounting panels and adapted to fit resiliently though snugly as installed more efficiently free of possible damage thereto.

Another object of this invention is to provide a wiring harness mounting clip means of flexible plastic material having a wire support taping body portion and an integral pair of recessed grip lug portions having a flexible reverse projection on each to accommodate greater variation in size of mounting panel aperturing and to facilitate attachment of harnesses to vehicle bodies along assembly lines.

Another object of this invention is to provide a harness mounting clip means of flexible plastic material having an elongated recessed wire support taping body portion and an integral pair of recessed grip lug portions each having a flexible reverse projection to accommodate greater variation in size of mounting panel apertures as well as integral opposite web-like flange means extending transversely from junctures between the lug portions and an under side of the wire support taping body portion for snug installation assuring against shifting as to aperture edging and thus providing an anti-rattle effect.

A further object of this invention is to provide improvement in wiring harness mounting clip means of flexible plastic material having an elongated wire support taping body portion and, more specifically, having a pair of downwardly extending integral web portions aligned though spaced as to each other and each integral with J-shaped lug portions also extending integrally downwardly to be more resilient and flexible in engaging stamped edging of a mounting panel aperturing such as in vehicle sheet metal which could damage more rigid and solid plastic material now hindered and secured against shifting in the aperturing due to anchoring of both the J-shaped lug portions as well as the aligned web portions relative to the stamped panel edging.

Another object of this invention is to provide a wiring harness mounting clip means made of thermoplastic nylon or polyamide material having an elongated wire support taping body portion and an integral pair of substantially J-shaped grip lug portions that can be inserted by manual pressure without tools into holes of predetermined range of variation of diameter as well as predetermined range of panel metal thickness regardless of deformation and edge burring due to metal fabrication processes such as stamping and assuring snug retention due to provision of web-like flange portions extending with an exposed arcuate edge between the body and gripping portions so as to anchor against shift of the clip means once installed in a panel hole with greater efficiency and at less cost.

Further objects and advantages of the present invention will be apparent from the following description, reference being had to the accompanying drawings wherein a preferred form of the present invention is clearly shown.

In the drawings:
FIGURE 1 is an end view of wiring harness mounting clip means having features in accordance with the present invention.
FIGURE 2 is a side view of the clip means of FIGURE 1 and showing improved grip portion structure.
FIGURE 3 is a plan view of the clip means of FIGURE 2.

During the manufacture of vehicles on a mass production basis, a need exists for minimizing cost of labor and materials as well as for efficiency as to assembly of parts including wiring harness installation. Previously, a snap-in retainer for wiring harness means has been provided as preassembled and retained with grouped wiring by wrapping of an insulation covering or spiral tape to enclose wiring harness clip means at least partially with a wiring harness means at predetermined locations. Reference can be made to U.S. Patent 2,931,851—Sims issued April 5, 1960, on this basic teaching which has now been improved and refined further in accordance with the present invention. On previous harness clip means it was found necessary to use hammers or similar tools to effect the force necessary to engage and install such clip means in an apertured panel of a vehicle body, for example. Use of such tools including hammers can result in damage to the clip means per se as well as to the wiring harness and also requires additional labor. Furthermore, if space available for insertion of a mounting installation is limited, then such tools cannot be used and considerable time has been lost in efforts of manual insertion where the clip means has a pair of relatively solid sections or lug portions as disclosed in U.S. Patent 2,931,851—Sims. These solid lug portions resist flexing during insertion particularly into smaller holes or apertures and quite often the edging or periphery of the apertures is quite rough and burrs or barbs along this edging due to metal fabrication such as stamping thereof can result in breakdown of holding surfaces which are already limited and thus provide even less retention for the wiring harness mounting clip means. Furthermore, retention characteristics are sacrificed with a resulting loose fit that occurs when the grip portions are reduced in size particularly when the installation is to be accomplished in aperturing in a relatively higher range of allowable tolerances encountered.

A wiring harness clip means of plastic material having features in accordance with the present invention can be seen in views of FIGURES 1, 2 and 3 of the drawings as identified by a general reference numeral 10. This clip means includes an elongated body portion 11 having integral transverse end extensions 12 and an arcuate or curved surface 14, the latter being most apparent in FIGURE 1. This curved surface 14 defines a trough-like recess into which wiring can be grouped as a harness means 16 retained by a wrapping of insulating material or tape as a covering 18 which surrounds the body portion 11 in predetermined locations along the wiring harness as covered by Patent 2,931,851—Sims. The end extensions 12 aid in retention of the body portion 11 at a predetermined location relative to the wrapped covering 18 of the wiring harness means and it is to be understood that substantially only the body portion 11 of the clip means 10 is within this wrapped covering 18.

In accordance with the present invention, a pair of substantially J-shaped or recessed grip lug portions 20 extend laterally from one side of the body portion 11. These lug portions 20 are separated from each other by a slot 21 which diverges and increases in width adjacent to outer ends 22 of the lug portions having an arcuate or curved surface to aid in entry of the lug portions initially relative to an aperture A of a metal mounting panel P of a vehicle body and the like. This apertured panel is indicated in views of FIGURES 2 and 3 and the thickness thereof can vary in a range between .035 inch and .100 inch, for example. Each of the pair of lug portions 20 includes an undercut or recess 23 that assures flexibility and relative freedom for lateral inward displacement temporarily of free ends 24 of each of the J-shaped lug or gripping portions 20. In a free condition, the lateral spacing of the free ends 24 from each other is greater than diameter of the panel aperture A except that the undercuts or recesses 23 as well as the diverging slot 21 permit flexing of the lug or gripping portions 20 toward each other simultaneous with inward displacement of the free ends 24 radially inwardly toward each other subject to resilient return to their normal positioning and engagement on a surface of one side of the panel P. The free ends 24, in effect, are reverse projections extending in a direction toward the taping or main body portion 11 but terminating at a predetermined distance to one side thereof. At this point of termination, the gripping portions collectively have their greatest width which exceeds the greatest diameter of the aperture or hole relative to which the clip means is to be installed. Outer surfacing of the free ends is curved or arcuate to facilitate entry in a round hole or aperturing and as insertion thereof through the hole or aperturing progresses, the edges of the hole contact the sides of the gripping lug portions thereby effecting a compression of the complementary pair of sections. Upon further insertion of the gripping lug portions or sections 20 there can be a limit to lateral or radially inward deflection thereof as determined by engagement of outer ends 22 against each other at the extremity thereof. Upon progressing further, the compression of the projecting lug portions continues and internal stresses result in a flexing action laterally and radially inwardly so far as the free ends 24 are concerned. Once the gripping lug portions 20 pass through the hole or aperture beyond the termination of the free ends 24, a resilient locking action occurs due to resilient return and springing of the gripping lug portions to the original and natural form thereof. Blunt or flat surface area of plastic material such as nylon and the like at the extremities of the outer projections or free ends 24 can provide locking engagement against a surface of the panel P on one side thereof and the rough-edged hole or aperture A is located peripherally around stem means 26 of the lug portions 20.

Further in accordance with the present invention, a pair of web-like wings or flange means 30 having a curved or arcuate outer edging 31 can be provided in alignment with each other and extending in opposite directions between the stems 26 of the J-shaped lug portions 20 and an outer periphery or surface 32 of the taping or main body portion 11. The arcuate edging 31 of these web-like flange means 30 can engage a periphery of the aperture A in the panel P along a surface opposite to that engaged by the free ends 24 of the reverse projections integral with the J-shaped lug portions 20. Collectively, the pair of free ends of the projections and the pair of web-like flange means indicated by reference numerals 24 and 30, respectively, can provide a four point anchoring against shifting of the lug portions of the clip means 10 relative to an apertured panel. The web-like flange means 30 in conjunction with the free ends 24 thus create an anti-rattle effect regardless of the variation in thickness of the panel P or variation of the diameter of the aperture A in the panel P. Furthermore, the web-like flange means 30 serves to strengthen right angular relationship of the lug portions 20 as to the body portion 11 of the wiring harness clip means. The web-like flange means 30 extends substantially longitudinally of the main or taping body portion 11 and thinness of the web-like flange means is such as to permit sufficient shearing or bending in these wings or flange means 30 per se to prevent and hinder shifting of more solid sections such as the stem 26 of the lug portions 20 against the rough edging of the hole or aperturing.

The features for installation of the wiring harness clip means and retention thereof relative to a vehicle panel aperturing can result in greater efficiency during wiring harness assembly to vehicle bodies with far less labor costs and a minimum of expense for the wiring harness clip means per se. Use of tools such as hammers is avoided since pressure required for manual engagement and installation is greatly minimized even for smaller diameter holes where previously solid lug portions became damaged to an extent that locking effect at best was only minimal. Previously, damage or breakdown of the plastic material of the solid lug means would result in easy disengagement of the wiring harness clip means whereas now the improved structure provides a positive and effective locking engagement. The taping or main body portion 11 of the wiring harness clip means can still be snugly included within the wrapping or covering portion 18 and the J-shaped resilient lug portions can project laterally or radially outwardly therefrom for improved retention and locking. Regardless of deformation and burring conditions of the panel in the vicinity of the aperturing therein, there can be a positive locking installation and retention of the wiring harness clip means without need for use of tools. In some installations it is even possible for free ends 24 and insertion ends 22 to be pressed laterally toward each other under urging of fingers and the like so as to facilitate removal of the J-shaped resilient lug portions without damage to the desired locking effects provided by the improved J-shaped resilient lug portions which can be reinstalled in the event a need arises to disengage a wiring harness means from a predetermined installed positioning.

While the embodiment of the present invention as herein disclosed constitutes a preferred form, it is to be understood that other forms might be adopted.

What is claimed is as follows:

A wiring harness mounting clip of a plastic material comprising an elongated body portion having a curved surface along one side to receive a group of wires, a lug portion integral with said body portion and projecting from the body portion side opposite the curved wire receiving surface, said lug portion including a pair of stem members being separated by a slot, each of said stem members having a flexible reverse projection extending a predetermined distance from the end of each stem member angularly toward said body portion with a recess space defined between each stem member and connecting flexible projection, and a web means including a pair of oppositely extending thin flange portions integral with said body and said lug portion, the cross sectional thickness of said flange portions being less than the cross sectional thickness of said lug portion, each of said flange portions including an arcuate peripheral surface extending respectively from one stem member to said body portion, each of said arcuate peripheral surfaces being respectively spaced from and aligned with an opposing terminating end of a reverse projection.

References Cited by the Examiner

UNITED STATES PATENTS

| | | | |
|---|---|---|---|
| 2,789,842 | 4/57 | Lief | 85—5 |
| 2,836,215 | 5/58 | Rapata | 16—2 |
| 2,931,851 | 4/60 | Sims | 174—72 |
| 3,088,702 | 5/63 | Orenick et al. | 174—40 X |
| 3,126,185 | 5/64 | Christman | 174—164 X |

E. JAMES SAX, *Primary Examiner.*

JOHN P. WILDMAN, *Examiner.*